250~
United States Patent Office 2,914,491
Patented Nov. 24, 1959

2,914,491

POLYMERIZATION OF EPOXIDES WITH FINELY DIVIDED ALKALINE EARTH METAL OXIDES

Frederick E. Bailey, Jr., Charleston, W. Va., assignor to Union Carbide Corporation, a corporation of New York No Drawing. Application March 3, 1958
Serial No. 718,424

11 Claims. (Cl. 260—2)

This invention relates to the polymerization of epoxides. In one aspect this invention relates to the preparation of polymers comprising ethylene oxide.

As is well recognized Staudinger et al. disclose in their article[1] the preparation of eucolloidal poly(ethylene oxide) having molecular weights of from 100,000 to 120,000 by reacting ethylene oxide in the presence of from 10 to 50 weight percent strontium oxide or calcium oxide catalyst for periods of time ranging upward to two years. The authors subsequently explain on page 43, below Table I of their article, that the isolation of recovery of the high molecular weight product by solution of the reaction mass in water, followed by centrifugation, and subsequent precipitation with an acetone-ether mixture, gave a polymer containing about 2 weight percent catalyst. Laborious and stringent after treatments, while eventually successful in removing the strontium- or calcium-containing contaminants from the polymer, resulted in severe molecular degradation of eucolloidal poly-(ethylene oxide) to the 15,000 to 20,000 molecular weight range.

By practicing the process of the instant invention as hereinafter set forth, there are obtained polymers comprising ethylene oxide which have molecular weights upward of several hundred thousand, and higher, which polymers contain less than 1.5 weight percent catalyst ash. In the preferred aspect of this invention, the contained catalyst ash in the polymer is less than 1.0 weight percent. Thus, for many fields of applications and uses these polymers containing such exceedingly small quantities of catalyst ash can be employed without first being subjected to expensive and laborious purification techniques. It is readily appreciated that the omission of the purification step is a decided advantage in view of the problem of molecular weight degradation that these polymers can encounter during the purification and recovery steps.

The present invention contemplates the preparation of water-soluble polymers comprising ethylene oxide which have a reduced viscosity in the range of from above about 1.0 and upwards to 25, and higher, by effecting the polymerization of ethylene oxide, alone, or in admixture with another alkylene oxide such as, for example, propylene oxide, 1,2-epoxybutane, 2,3-epoxybutane, and the like, in contact with an alkaline earth metal oxide catalyst which has an average particle size less than 4,000 angstroms in average diameter, and preferably less than 1,500 angstroms. The polymerization reaction is conducted in the liquid phase at a temperature of from about 75° to about 150° C. When copolymerizing ethylene oxide with a lower alkylene oxide, e.g., propylene oxide, the epoxybutanes, and the like, the ethylene oxide reactant comprises at least about 50 weight percent of the total monomeric charge. The resulting resinous copolymer is water-soluble at room temperature, i.e., approximately 25° C. As will be apparent from the operative examples hereinafter, the practice of the instant invention with the above-mentioned particulate catalyst class results in substantially quantitative conversion of monomeric starting material to polymer which has a reduced viscosity above about 1.0 in less than 24 hours.

It is deemed advisable at this point to explain the term "reduced viscosity." By the term "reduced viscosity," as used herein, is meant a value obtained by dividing the specific viscosity by the concentration of the polymer in the solution, the concentration being measured in grams of polymer per 100 milliliters of solvent. The specific viscosity is obtained by dividing the difference between the viscosity of the solution and the viscosity of the solvent by the viscosity of the solvent. The reduced viscosity values of the polymers hereinafter referred to are obtained by dissolving 0.2 gram of the polymer in question in 100 milliliters of acetonitrile at 30° C. It should also be pointed out that the reduced viscosity values are a measure of molecular weight; the higher the reduced viscosity numerical value, the higher or greater the molecular weight of the polymer.

Accordingly, one or more of the following objects will be achieved by the practice of this invention.

It is an object of this invention to provide a novel process for the production of water-soluble polymers comprising ethylene oxide which have a reduced viscosity in the range of from above about 1.0 and upwards to 25, and higher. It is another object of this invention to provide a novel process for preparing polymers comprising ethylene oxide by polymerizing the appropriate monomeric starting material in the presence of a catalytic amount of an alkaline earth metal oxide catalyst which has an average particle size of less than 4,000 angstroms in average diameter, and preferably less than 1,500 angstroms. A yet further object of this invention is to provide a novel polymerization process which, under the operative conditions of said process and in the presence of a catalytic amount of the above-described particulate alkaline earth metal oxide catalysts, yield polymers comprising ethylene oxide which have a reduced viscosity above about 1.0, at reaction rates heretofore not obtained or contemplated by the art. Other objects will become apparent to those skilled in the art in the light of the instant specification.

The particulate alkaline earth metal oxide catalyst, i.e., calcium oxide, strontium oxide, or barium oxide, is employed at concentrations ranging from about 0.05 to 1.5 weight percent, preferably from about 0.1 to 1.0 weight percent, based on the weight of monomeric feed. As alleged previously, the art is well apprised of the fact that laborious and stringent techniques are necessary to essentially purify contaminated ethylene oxide polymers (which have a reduced viscosity of at least 1.0). Such purification techniques are both expensive and also, subject the polymer to molecular weight degradation. However, in view of the catalyst concentration contemplated in the instant process, the amount of catalyst and in the resulting polymer can be considered negligible for many fields of applications and uses. Moreover, by practicing the instant invention in accordance with the teachings set out in this disclosure, essentially quantitative conversion of monomeric starting material to polymer can be achieved in less than 24 hours.

The polymerization reaction is conducted at a temperature of at least about 75° C. and upwards to about 150° C. It is essential that the minimum temperature employed be at least about 75° C.; decreasing the temperature below this point results in a rapid decrease in the reaction rate. For example, by maintaining the reaction temperature at 25° C., substantially no polymerization was apparent over a period of several weeks. However, by maintaining a reaction temperature, for example, of

[1] Ann. der Chem., 505 (1933), pages 41–51.

about 90° C. essentially quantitative conversion of monomer to polymer (with reduced viscosities as high as 12, i.e., molecular weights of several hundred thousand) were obtained in less than 24 hours.

The polymerization reaction takes place in the liquid phase and a pressure above atmospheric is generally employed to maintain the reaction mixture in the liquid phase. However, it should be noted that external pressure is not essential; it is necessary only to employ a reaction vessel capable of withstanding the autogenous pressure of the reaction mixture.

The practice of the instant invention can be accomplished via the bulk polymerization route, i.e., absence of extraneous inert organic media, or via the solution polymerization route, i.e., the addition of inert organic media to the reaction mixture, i.e., an inert organic medium in which the monomer employed and polymer produced are soluble.

Exemplary inert organic media which can be employed via the solution polymerization route include benzene, alkyl substituted-benzene, and chlorobenzene, in which both monomeric ethylene oxide and the resulting polymers are soluble. These inert organic diluents can be used in amounts varying from about 5 to 90 weight percent, based on the weight of the total charge. The use of the above-mentioned diluents in the polymerization of epoxides is the subject matter of the application entitled "Polymerization of Ethylene Oxide," by W. A. Denison, Serial No. 650,859, filed April 5, 1957, and assigned to the same assignee as the instant application.

Both ethylene oxide and the polymers formed are also soluble in anisole and, at least at temperatures above about 90° C., in ethers such as dimethyl and diethyl ethers of glycols such as ethylene glycol, propylene glycol, and diethylene glycol. The process using these inert organic media in amounts varying from about 5 to 95 weight percent, based on the weight of the total charge, is the subject matter of the application entitled, "Solvent Polymerization of Ethylene Oxide," by F. E. Bailey, Jr., Serial No. 587,952, filed May 29, 1956, and assigned to the same assignee as the instant application.

The preparation of particulate alkaline earth metal oxide, namely, calcium oxide, strontium oxide, and barium oxide, which have an average particle size of less than 4,000 angstroms in average diameter, preferably less than 1,500 angstroms, is described in application Serial No. 721,089, entitled "Particulate Metal Compounds," by T. L. Thomas and D. M. Gillies, filed March 13, 1958, and assigned to the same assignee as the instant application. In above-said application Serial No. 721,089, an alkaline earth metal is vaporized at elevated temperatures in, for example, an elongated reaction zone, or said metal can be vaporized from a source outside the reaction system and subsequently, the metal vapors can be introduced into said reaction zone. A non-reactive gas such as argon then can be introduced into the reaction tube, if desired, and the resulting vaporized metal and non-reactive gas mixture flow through the elongated reaction zone to an area within said zone where impingement of this mixture with oxygen is effected. The oxygen stream can be introduced into the above-said reaction zone through, for example, a quartz lance, which is equipped at its nozzle with a thermocouple. The reaction of alkaline earth metal vapor and oxygen is conducted at a predetermined temperature range which is below about the melting point of the resulting particulate metal oxide product and, of course, above about the temperature necessary to effect the chemical combination of alkaline earth metal and oxygen. By controlling or adjusting the reaction temperature within the predetermined temperature range, the average particle size of the resulting oxide product can be tailor-made since a decrease in temperature within said predetermined temperature range produces a corresponding decrease in particle size of the oxide product. The particulate oxides thus produced are very finely divided, free-flowing powders, and they are free of contaminating ions.

The ethylene oxide polymers, throughout the range of reduced viscosities from above about 1.0 to about 25, and higher, are water-soluble. They appear to form homogeneous systems with water in all proportions at room temperature. Although the higher molecular weight polymers merely swell on the addition of small amounts of water, on the addition of greater amounts of water, the polymers pass into solution. The water solutions are viscous, the viscosity increasing both with the concentration of the polymer in the solution and the reduced viscosity of the polymer. These polymers of ethylene oxide show little change in melting point with increased reduced viscosity (increased molecular weight) and the melting point, as measured by change in stiffness with temperature, is found to be about $65° \pm 2°$ C. throughout the range of reduced viscosities of from about 1.0 to 10, and higher. These polymers, upon X-ray examination, show the sort of crystallinity exhibited by solid polyethylene. The crystallization temperature, as determined from measuring the break in the cooling curve, is about 55° C. The ethylene oxide polymers produced by the present method are soluble in water, acetonitrile, chloroform, formaldehyde, and mixtures of water and saturated aliphatic alcohols. They are insoluble in anhydrous acetone, methyl ethyl ketone, ethyl acetate, and carbon tetrachloride.

The ethylene oxide polymers which have a reduced viscosity of at least 1.0 are hard, tough, horny, water-soluble materials. These polymers are useful for the production of various shaped articles. The poly(ethylene oxides) prepared by the instant invention are also useful in the sizing of synthetic and natural warp yarn and, also, as a coagulant or flocculant for solids comprising silica and/or clay mineral dispersed in aqueous media. The copolymers, i.e., polymers comprising at least about 50 weight percent ethylene oxide (based on the weight of copolymer) and another lower alkylene oxide such as propylene oxide, butylene oxides, and the like, are hard, tough, water-soluble materials. These copolymers are useful in the preparation of films and various shaped articles.

In the illustrative examples below the procedure which can be employed to prepare the polymer is as follows. A 9-inch Pyrex tube 22 mm. in diameter is sealed at one end; the other end of the tube is fitted with a 3-inch piece of 8 mm. Pyrex tubing. The tube is cleaned, dried and flushed with dry nitrogen; a weighed quantity of catalyst is then introduced into the tube. The tube is subsequently filled in a "dry box" containing a nitrogen atmosphere and the monomeric material is added to the tube. The tube is then closed with a rubber cap, followed by cooling in dry-acetone bath; the tube is sealed with the vacuum thus obtained. The sealed tube is subsequently inserted into an aluminum block, said aluminum block being agitated by rocking at the desired operating temperature for a given period of time. After this, the tube is cracked open and the resulting polymer is removed for examination.

*Example 1*

To a glass tube containing strontium oxide having an average particle size of 300–1,000 angstroms in average diameter (surface area equal to 46 square meters per gram) there was charged ethylene oxide in an amount so as to give an admixture containing 0.3 weight percent strontium oxide. The tube was sealed and then inserted into an aluminum block which was rocked for a period of 23 hours at 90° C. No induction period was observed. The conversion of monomer to polymer was essentially quantitative and the resulting polymer possessed a reduced viscosity of 8.5.

Example 2

To a glass tube containing strontium oxide having an average particle size of 300–1,000 angstroms in average diameter (surface area equal to 46 square meters per gram) there were charged equal parts by weight of toluene and ethylene oxide, the resulting admixture containing 0.5 weight percent strontium oxide, based on the weight of ethylene oxide. The tube was sealed and then inserted into an aluminum block which was rocked for a period of 20.5 hours at 90° C. An induction period of 6 hours was observed. The conversion of monomer to polymer was essentially quantitative and the resulting polymer possessed a reduced viscosity of 12.

Example 3

To a glass tube containing calcium oxide having an average particle size of 200 angstroms in average diameter (surface area equal to 123 square meters per gram) there was charged ethylene oxide in an amount so as to give an admixture containing 0.3 weight percent calcium oxide. The tube was sealed and then inserted into an aluminum block which was rocked for a period of 19 hours at 90° C. An induction period of 2.5 hours was observed. The conversion of monomer to polymer was essentially quantitative and the resulting polymer possessed a reduced viscosity of 4.

Example 4

To a glass tube containing calcium oxide having an average particle size of 200 angstroms in average diameter (surface area equal to 123 square meters per gram) there were charged equal parts by weight of toluene and ethylene oxide, the resulting admixture containing 0.5 weight percent calcium oxide, based on the weight of ethylene oxide. The tube was sealed and then inserted into an aluminum block which was rocked for a period of 20 hours at 90° C. An induction period of 9.5 hours was observed. The conversion of monomer to polymer was essentially quantitative and the resulting polymer possessed a reduced viscosity of 4.

Example 5

To a glass tube containing strontium oxide having an average particle size of 300–1,000 angstroms in average diameter (surface area equal to 46 square meters per gram) there is charged ethylene oxide and propylene oxide in an amount which gives an admixture containing 0.3 weight percent strontium oxide. Of the total monomeric charge ethylene oxide constitutes 90 parts by weight and propylene oxide 10 parts by weight. The tube is sealed and subsequently is inserted into an aluminum block which is rocked for a period of 22 hours at 110° C. The conversion of monomeric material to copolymer is essentially quantitative. The resulting copolymer is hard, tough and water-soluble.

Example 6

To a glass tube containing toluene and strontium oxide having an average particle size of 300–1,000 angstroms in average diameter (surface area equal to 46 square meters per gram) there is charged ethylene oxide and propylene oxide in an amount which gives an admixture containing 0.5 weight percent strontium oxide, based on the total weight of monomeric charge. The resulting admixture contains 40 parts by weight of toluene, and of the total monomeric charge ethylene oxide constitutes 70 parts by weight and propylene oxide 30 parts by weight. The tube is sealed and subsequently is inserted into an aluminum block which is rocked for a period of 21 hours at 100° C. The conversion of monomeric material to copolymer is essentially quantitative. The resulting copolymer is hard, tough and water-soluble.

Example 7

To a glass tube containing barium oxide having an average particle size of 1,200 angstroms in average diameter there is charged ethylene oxide and 1,2-epoxybutane in an amount which gives an admixture containing 0.3 weight percent barium oxide. Of the total monomeric charge ethylene oxide constitutes 80 parts by weight and 1,2-epoxybutane 20 parts by weight. The tube is sealed and subsequently is inserted into an aluminum block which is rocked for a period of 20 hours at 100° C. The conversion of monomeric material to copolymer is essentially quantitative. The resulting copolymer is hard, tough and water-soluble.

It is obvious that various modifications of this invention can be made without departing from the spirit and scope thereof.

What is claimed is:

1. A process which comprises contacting monomeric material selected from the group consisting of (a) ethylene oxide and (b) an admixture of ethylene oxide with an alkylene oxide having from 3 to 4 carbon atoms, said admixture containing at least about 50 weight percent of ethylene oxide, with a catalytic amount of particulate alkaline earth metal oxide which has an average particle size of less than 4,000 angstroms in average diameter, at a temperature of at least 75° C., and for a period of time sufficient to produce a solid polymer.

2. The process of claim 1 wherein said monomeric material is ethylene oxide.

3. The process of claim 1 wherein said monomeric material is ethylene oxide and propylene oxide.

4. The process of claim 1 wherein said monomeric material is ethylene oxide and butylene oxide.

5. A process for preparing poly(ethylene oxide) which has a reduced viscosity value of above about 1.0 as determined at a concentration of 0.2 gram of said poly(ethylene oxide) in 100 milliliters of acetonitrile at 30° C. which comprises contacting ethylene oxide with from about 0.05 to about 1.5 weight percent of particulate alkaline earth metal oxide which has an average particle size of less than 4,000 angstroms in diameter, at a temperature of at least 75° C., and for a period of time sufficient to produce said poly(ethylene oxide).

6. The process of claim 5 wherein the average particle size of said alkaline earth metal oxide is less than 1,500 angstroms in average diameter.

7. The process of claim 5 wherein the concentration of said alkaline earth metal oxide is from about 0.1 to about 1.0 weight percent, based on the weight of ethylene oxide.

8. The process of claim 5 wherein said alkaline earth metal oxide is calcium oxide.

9. The process of claim 5 wherein said alkaline earth metal oxide is barium oxide.

10. The process of claim 5 wherein said alkaline earth metal oxide is strontium oxide.

11. A process which comprises contacting ethylene oxide with a catalytic amount of particulate alkaline earth metal oxide which has an average particle size of less than 4,000 angstroms in average diameter, at a temperature of at least 75° C., and for a period of time sufficient to produce poly(ethylene oxide) which has a reduced viscosity value of above about 1.0 as determined at a concentration of 0.2 gram of said poly(ethylene oxide) in 100 milliliters of acetonitrile at 30° C.

References Cited in the file of this patent

Staudinger et al.: Ann. der Chem., 505 (1933), pages 41–51.

Emmett: "Catalysis," vol. 1, Reinhold Pub. Co., N.Y., 1954, pages 31–40. (Copies in Scientific Library.)